United States Patent
Chai et al.

(10) Patent No.: US 9,270,146 B2
(45) Date of Patent: Feb. 23, 2016

(54) BRUSHLESS MOTOR

(71) Applicant: Johnson Electric S.A., Murten (CH)

(72) Inventors: Jie Chai, Hong Kong (CN); Yan Ke, Shenzhen (CN); Xiaojun Yang, Shenzhen (CN); Yongsheng Gao, Hong Kong (CN); Sanyuan Xiao, Shenzhen (CN); Hai Chen, Hong Kong (CN)

(73) Assignee: Johnson Electric S.A., Murten (CH)

( * ) Notice: Subject to any disclaimer, the term of this patent is extended or adjusted under 35 U.S.C. 154(b) by 361 days.

(21) Appl. No.: 13/730,609

(22) Filed: Dec. 28, 2012

(65) Prior Publication Data

US 2013/0169086 A1    Jul. 4, 2013

(30) Foreign Application Priority Data

Dec. 29, 2011    (CN) .......................... 2011 1 0451690

(51) Int. Cl.
*H02K 3/28* (2006.01)
*H02K 3/52* (2006.01)
(52) U.S. Cl.
CPC ............... *H02K 3/28* (2013.01); *H02K 3/522* (2013.01); *H02K 2203/03* (2013.01)
(58) Field of Classification Search
CPC .......... H02K 3/28; H02K 3/522; H02K 5/225
USPC .............................................................. 310/71
IPC ................................................. H02K 3/38,5/22
See application file for complete search history.

(56) References Cited

U.S. PATENT DOCUMENTS

| 4,115,915 | A | * | 9/1978 | Godfrey | .......................... 29/596 |
| 6,023,117 | A | * | 2/2000 | Chen | ............................... 310/91 |
| 6,153,957 | A | * | 11/2000 | Takano | ........................... 310/71 |
| 7,247,962 | B2 | * | 7/2007 | Burgbacher | .................... 310/71 |
| 7,692,356 | B2 | * | 4/2010 | Bott et al. | ..................... 310/260 |

FOREIGN PATENT DOCUMENTS

JP         2009247138  A  * 10/2009

* cited by examiner

*Primary Examiner* — Thomas Truong
(74) *Attorney, Agent, or Firm* — Muncy, Geissler, Olds & Lowe, P.C.

(57) ABSTRACT

A brushless motor includes a stator core having 3M teeth, with M being an integer not less than 2, a rotor received in the stator core, 3M coils respectively wound around the 3M teeth, and a printed circuit board (PCB) fixed to the stator core and electrically connected to the 3M coils such that the 3M coils are connected in delta and correspond to three phase windings. Each phase includes at least two coils connected in parallel.

12 Claims, 3 Drawing Sheets

BRUSHLESS MOTOR

CROSS REFERENCE TO RELATED APPLICATIONS

This non-provisional patent application claims priority under 35 U.S.C. §119(a) from Patent Application No. 201110451690.9 filed in The People's Republic of China on Dec. 29, 2011.

FIELD OF THE INVENTION

The present invention relates to a brushless motor and particularly, relates to a brushless motor having coils connected in parallel.

BACKGROUND OF THE INVENTION

Power tools such as electric drill and electric hammer are usually required to generate an output of high rotational speed when provided with a low voltage. Therefore, large current will flow through the coils of the motor of the power tool. In this case, wire of relatively greater diameter will be preferably used to make the coils. However, due to the great diameter of the wire, it is difficult for common winding machines to wind the coils. Further, the bobbin of the motor and the insulating layer on the surface of the wire can be easily damaged. To overcome this problem, wire of relatively lesser diameter, is used to produce the coils, while a number of additional wires are employed to connect corresponding coils in parallel by spot welding. However, it is inconvenient and time-consuming to weld the additional wires. Further, operation of the power tool will cause the additional wire to vibrate intensely with respect to the coils, which will easily break the connection between the coil and the additional wire.

The present invention aims to provide a new brushless motor having firm connections between corresponding coils.

SUMMARY OF THE INVENTION

Accordingly, in one aspect thereof, the present invention provides a brushless motor, comprising: a stator core having 3M teeth, M being an integer not less than 2; a rotor received in the stator core; 3M coils respectively wound around the 3M teeth; and a printed circuit board (PCB) fixed to the stator core and electrically connected to the 3M coils such that the 3M coils are connected in delta and correspond to three phase windings, each phase comprising at least two coils connected in parallel.

Preferably, each coil is wound around an individual tooth and electrically connected to corresponding coils via the PCB.

Preferably, the PCB is arranged at an axial end of the stator core.

Preferably, a cap is connected to an axial end of the stator core and having hooks protrude away from the stator core, the hooks engaging the PCB to fix the PCB to the stator core.

Preferably, the PCB comprises a plurality of notches and the hooks engage the PCB in the notches.

Preferably, the PCB comprises three electrical connection wires printed thereon, each connection wire having two ends, each end being connected to coils corresponding to different phase windings, and a portion of each connection wire between the two ends thereof is configured for connecting a phase of a three-phase power supply.

Preferably, each end of each connection wire has an aperture extending through the PCB, ends of the coils are received in corresponding apertures and electrically connected to corresponding connection wires.

Preferably, the apertures are exposed at the edge of the PCB.

Preferably, an inner surface of each aperture is formed with an electrical conductive layer that is electrically connected to the end of the corresponding connection wire.

Preferably, the ends of the coils are a tight fit in corresponding apertures.

Preferably, each connection wire is substantially semicircular and the ends of each connection wire are respectively located between adjacent coils.

Preferably, about one-third of each connection wire that is close to an end thereof is arranged at a radial outer side of an adjacent connection wire, and about one-third of this connection wire that is close to the other end thereof is arranged at a radial inner side of another adjacent connection wire.

Preferably, first to sixth coils are arranged in order in the circumferential direction, and each coil comprises a first end and a second end; one end of a first one of the three connection wires is connected to the first ends of the first and second coils, and the other end of said first connection wire is connected to the first ends of the fourth and fifth coils; one end of a second one of the three connection wires is connected to the second ends of the second and third coils, and the other end of said second connection wire is connected to the second ends of the fifth and sixth coils; and one end of a third one of the three connection wires is connected to the first end of the sixth coil and the second end of the first coil, and the other end of the third connection wire is connected to the second ends of the third and fourth coils.

Preferably, the PCB comprising power transistors arranged directly thereon for control of the currents in the coils.

In embodiments of the present invention, as corresponding coils are connected to each other via the circuit board, it is not easy for external vibration to break the electrical connections between the coils.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
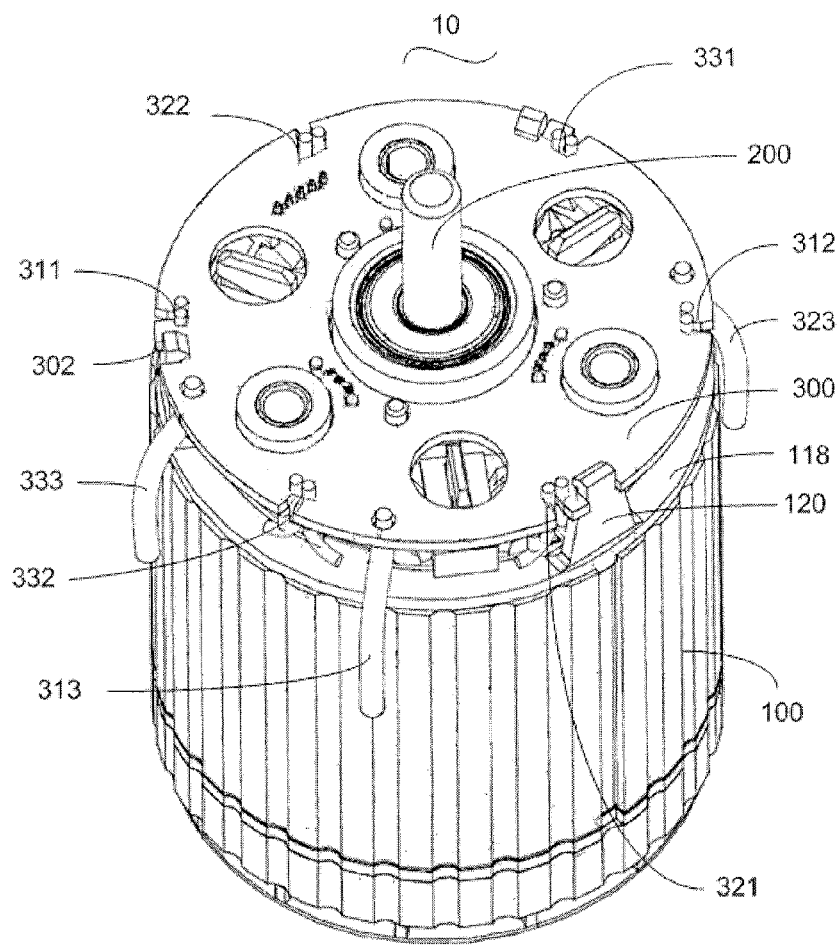
FIG. 1 shows a brushless motor in accordance with a preferred embodiment of the present invention.

Referring to FIG. 1, a brushless motor 10, according to the preferred embodiment of the present invention, has a stator 100, a permanent magnet rotor 200 received in the stator 100, and a printed circuit board (PCB) 300 disposed on an axial end of the stator 100.

Figure 2:
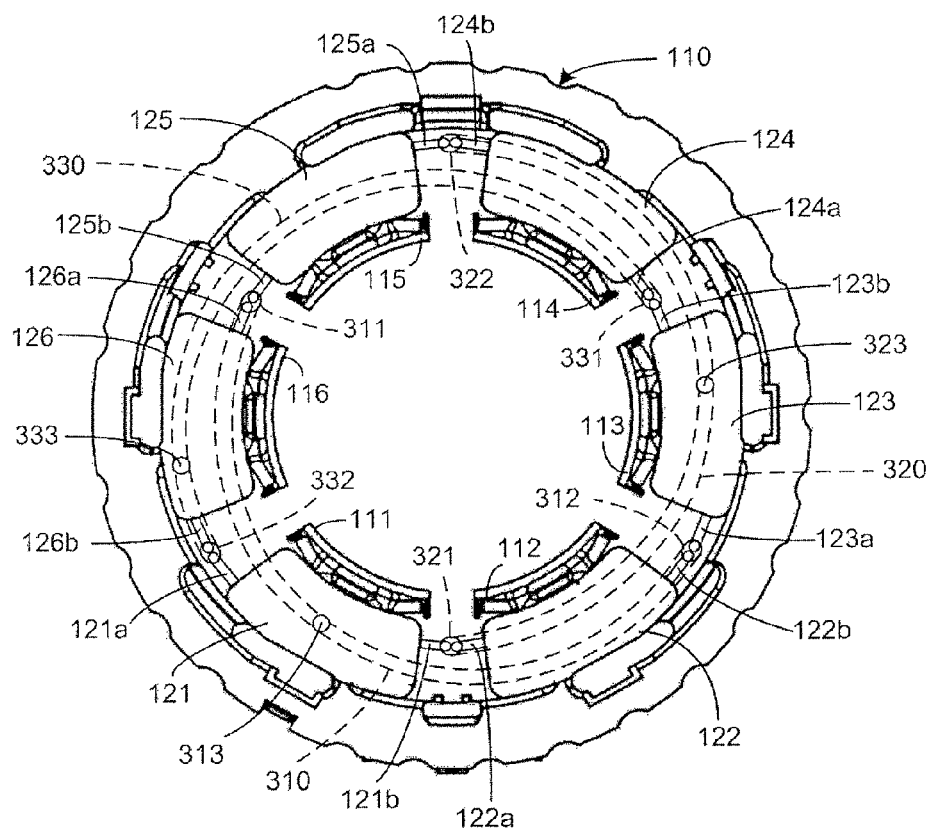
FIG. 2 shows the position relationship between coils and connection wires of a printed circuit board according to another preferred embodiment.
Figure 3:
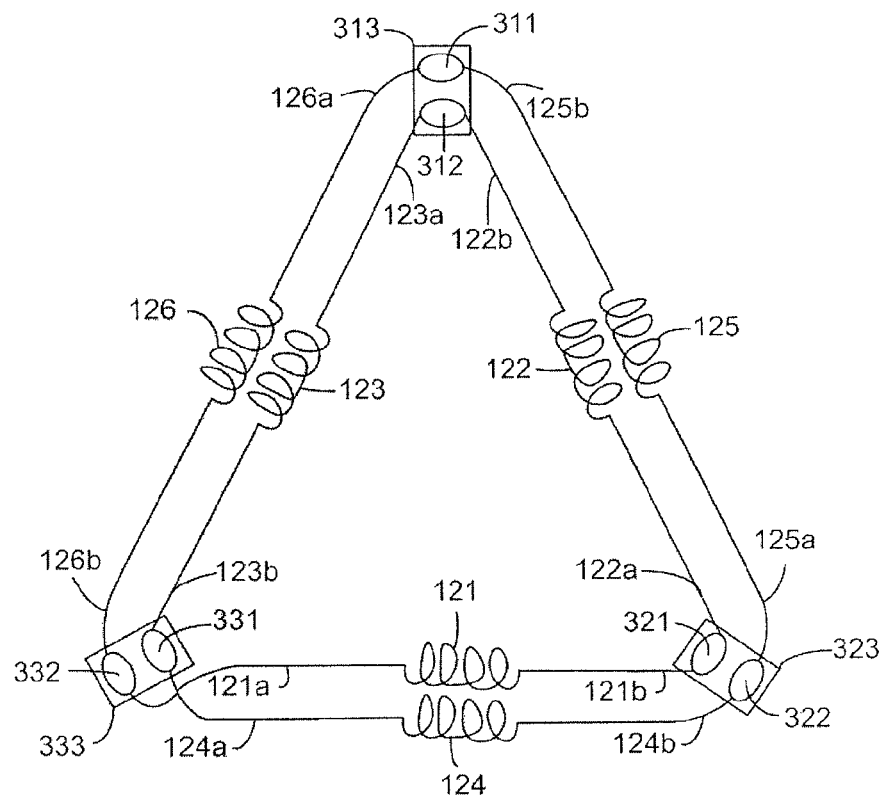
FIG. 3 is a schematic winding diagram showing the electrical connection between coils of the motor.

Further referring to FIGS. 2 and 3, the stator 100 includes a stator core 110 having six teeth, a cap 118 connected to an axial end surface of the stator core 110, and six coils wound around corresponding teeth. The first to sixth coils 121 to 126 are respectively wound around the first to sixth teeth 111 to 116 of the stator core 110. The cap 118 includes a number of hooks 120. The first to sixth coils 121 to 126 respectively includes first ends 121a, 122a, 123a, 124a, 125a, 126a and second ends 121b, 122b, 123b, 124b, 125b, 126b that all extend towards the PCB 300.

The PCB 300 is substantially circular and the outer diameter thereof is substantially equal to that of the stator core 110. The PCB 300 has a hole at the center thereof for a shaft of the rotor 200 to pass through and a number of notches 302 at the peripheral thereof. The hooks 120 engage with the notches 302 to connect the PCB 300 to the stator 100. The PCB 300 further includes a first connection wire 310, a second connection wire 320, and a third connection wire 330, in the form of conductive tracks, printed thereon. The first to third connection wires 310, 320, and 330 are all substantially semicircular and are evenly arranged along the circumferential direction of the PCB 300.

The first to third connection wires 310, 320, and 330 respectively include start terminals 311, 321, 331, end terminals 312, 322, 332, and connection points 313, 323, 333 between corresponding start terminal and end terminal for connection of a three phase power source. The PCB 300 defines six apertures (shown in detail in FIG. 4), each of which is arranged at the individual start terminals and end terminals of the three connection wires. About one-third of each connection wire that is close to its start terminal is arranged at a radially outer side of an adjacent connection wire, and about one-third of this connection wire that is close to its end terminal is arranged at a radially inner side of another adjacent connection wire.

The start terminals 311, 321, 331 and the end terminals 312, 322, 332 are respectively arranged between two adjacent coils. As such, it is convenient to connect the start/end terminal to coils at both sides.

In detail, the start terminal 311 of the first connection wire 310 is arranged between the fifth coil 125 and the sixth coil 126. The second end 125b of the fifth coil 125 and the first end 126a of the sixth coil 126 are inserted into the aperture at the start terminal 311 and are welded to the start terminal 311. As such, the second end 125b and the first end 126a are connected to the start terminal 311. The end terminal 312 of the first connection wire 310 is arranged between the second coil 122 and the third coil 123, and is connected to the second end 122b of the second coil 122 and the first end 123a of the third coil 123 by the way described above.

Similarly, the start terminal 321 of the second connection wire 320 is arranged between the first coil 121 and the second coil 122, and is connected to the second end 121b of the first coil 121 and the first end 122a of the second coil 122; the end terminal 322 of the second connection wire 320 is arranged between the fourth coil 124 and the fifth coil 125, and is connected to the second end 124b of the fourth coil 124 and the first end 125a of the fifth coil 125. The start terminal 331 of the third connection wire 330 is arranged between the third coil 123 and the fourth coil 124, and is connected to the second end 123b of the third coil 123 and the first end 124a of the fourth coil 124; the end terminal 332 of the third connection wire 330 is arranged between the sixth coil 126 and the first coil 121, and is connected to the second end 126b of the sixth coil 126 and the first end 121a of the first coil 121.

In this way, the first to sixth coils 121 to 126 are connected in delta and correspond to three phase windings, and each phase winding includes two coils connected in parallel. Specifically, the first coil 121 and fourth coil 124 are connected in parallel between the connection point 333 and the connection point 323. The second coil 122 and the fifth coil 125 are connected in parallel between the connection point 323 and the connection point 313. The third coil 123 and the sixth coil 126 are connected in parallel between the connection point 313 and the connection point 333.

In the embodiment described above, as the connection wires are printed directly on the circuit board, it is convenient and efficient to weld or solder the coils to the circuit board. Also, it is convenient to connect or weld the coils to the aperture. Further, as the PCB is fixed to the stator core, the connections between the coils and the connection wires are relatively strong.

Figure 4:
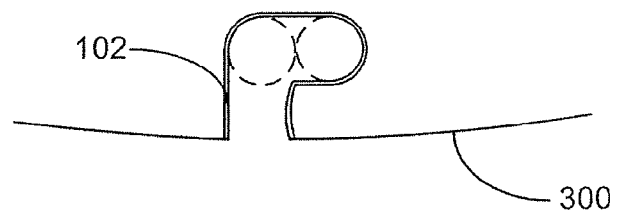
FIG. 4 is an enlarged detail view of a portion of the printed circuit board showing a preferred aperture therein for connection of the coils.

Referring to FIG. 4, in other embodiments, the aperture at the start/end terminals can extend to the edge of the circuit board. As such, ends of the coils can go into the aperture through the part of the aperture exposed on the edge of the circuit board, which makes it convenient and efficient to assemble.

Preferably, the inner surface of the aperture is formed with an electrical conductive layer 102 that is electrically connected to the corresponding start/end terminal. This can enhance the connection between the ends of the coils and corresponding connection wires. Further more, the size of the apertures can be made to a degree that the ends of the coils can be a tight fit in the corresponding aperture. In this way, welding can be omitted.

In other embodiments, power transistors for control of the currents in the stator coils can be arranged directly on the circuit board.

Under the guidance of the above described embodiment, when there is a need to connect more than two coils in parallel in each phase, a person skilled in the art can modify the arrangement of each of the connection wires to obtain the desired circuit. Therefore, it will be understood that the number of coils of each phase connected in parallel in the present invention is not limited to two.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A brushless motor, comprising:
   a stator core having 3M teeth, M being an integer not less than 2;
   a rotor received in the stator core;
   3M coils respectively wound around the 3M teeth; and
   a printed circuit board (PCB) fixed to the stator core and electrically connected to the 3M coils such that the 3M coils are connected in delta and correspond to three phase windings, each phase comprising at least two coils connected in parallel,
   wherein the PCB comprises three electrical connection wires printed thereon, each connection wire having two ends, each end being connected to coils corresponding to different phase windings, and a portion of each connection wire between the two ends thereof is configured for connecting a phase of a three-phase power supply, wherein the PCB defines a plurality of apertures, more than one ends of the coils corresponding to different phase windings being inserted into each of the apertures and connected to a corresponding one end of the connection wires, and wherein the plurality of apertures are arranged between two adjacent coils.

2. The brushless motor of claim 1, wherein each coil is wound around an individual tooth and electrically connected to corresponding coils via the PCB.

3. The brushless motor of claim 1, wherein the PCB is arranged at an axial end of the stator core.

4. The brushless motor of claim 3, further comprising a cap connected to an axial end of the stator core and having hooks protruding away from the stator core, wherein the hooks engage the PCB to fix the PCB to the stator core.

5. The brushless motor of claim 4, wherein the PCB comprises a plurality of notches and the hooks engage the PCB in the notches.

6. The brushless motor of claim 1 wherein the apertures are exposed at the edge of the PCB.

7. The brushless motor of claim 6, wherein a circumferential inner surface of each aperture is formed with an electrical conductive layer that is electrically connected to the end of the corresponding connection wire.

8. The brushless motor of claim 7, wherein the ends of the coils are a tight fit in corresponding apertures.

9. The brushless motor of claim 1, wherein each connection wire is substantially semicircular, the ends of the connection wire are respectively located between adjacent coils.

10. The brushless motor of claim 9, wherein about one-third of each connection wire that is close to an end thereof is arranged at a radial outer side of an adjacent connection wire, and about one-third of this connection wire that is close to the other end thereof is arranged at a radial inner side of another adjacent connection wire.

11. The brushless motor of claim 1, comprising first to sixth coils arranged in order in the circumferential direction, wherein each coil comprises a first end and a second end; one end of a first one of the three connection wires is connected to the first ends of the first and second coils, and the other end of said first connection wire is connected to the first ends of the fourth and fifth coils; one end of a second one of the three connection wires is connected to the second ends of the second and third coils, and the other end of said second connection wire is connected to the second ends of the fifth and sixth coils; and one end of a third one of the three connection wires is connected to the first end of the sixth coil and the second end of the first coil, and the other end of the third connection wire is connected to the second ends of the third and fourth coils.

12. The brushless motor of claim 1, wherein the PCB comprising power transistors arranged directly thereon for control of the currents in the coils.

\* \* \* \* \*